US012610124B2

(12) United States Patent
Wang et al.

(10) Patent No.: US 12,610,124 B2
(45) Date of Patent: Apr. 21, 2026

(54) IMAGE CAPTURE WITH ARTIFACT REMEDIATION

(71) Applicant: Lenovo (Singapore) Pte. Ltd., Singapore (SG)

(72) Inventors: Mengnan Wang, Durham, NC (US); John Weldon Nicholson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 238 days.

(21) Appl. No.: 18/603,160

(22) Filed: Mar. 12, 2024

(65) Prior Publication Data

US 2025/0294234 A1 Sep. 18, 2025

(51) Int. Cl.
| | |
|---|---|
| H04N 23/61 | (2023.01) |
| G06T 7/00 | (2017.01) |
| H04N 23/60 | (2023.01) |
| H04N 23/617 | (2023.01) |
| H04N 23/67 | (2023.01) |

(52) U.S. Cl.
CPC ........... H04N 23/61 (2023.01); G06T 7/0002 (2013.01); H04N 23/617 (2023.01); H04N 23/64 (2023.01); H04N 23/675 (2023.01); G06T 2207/20081 (2013.01)

(58) Field of Classification Search
CPC .... H04N 23/675; H04N 23/61; H04N 23/617; H04N 23/64; G06T 7/0002; G06T 2207/20084; G06T 2207/20081

USPC ........................................................ 348/222.1
See application file for complete search history.

(56) References Cited

U.S. PATENT DOCUMENTS

| | | | | |
|---|---|---|---|---|
| 9,396,523 | B2 * | 7/2016 | Jancsary | G06T 5/60 |
| 11,887,219 | B2 * | 1/2024 | Kanazawa | G06T 11/001 |
| 12,368,950 | B2 * | 7/2025 | Jain | G06T 5/60 |
| 12,482,077 | B2 * | 11/2025 | Amirghodsi | G06T 5/60 |
| 2015/0030237 | A1 * | 1/2015 | Jancsary | G06T 5/60 |
| | | | | 382/159 |
| 2022/0101508 | A1 * | 3/2022 | Tang | G06T 7/11 |
| 2022/0245932 | A1 * | 8/2022 | Gauerhof | G06N 3/045 |
| 2022/0254075 | A1 * | 8/2022 | Kanazawa | G06N 3/0455 |
| 2023/0005251 | A1 * | 1/2023 | Take | G06N 3/094 |
| 2023/0055146 | A1 * | 2/2023 | Wang | G06V 10/82 |
| 2023/0073223 | A1 * | 3/2023 | Bergmann | G06T 7/0004 |
| 2023/0199301 | A1 * | 6/2023 | Jain | G06V 10/248 |
| | | | | 348/241 |
| 2023/0281959 | A1 * | 9/2023 | Hoshen | G06N 3/0464 |
| | | | | 382/225 |
| 2024/0046429 | A1 * | 2/2024 | Amirghodsi | G06T 7/11 |
| 2024/0362835 | A1 * | 10/2024 | Arberet | G01R 33/5608 |
| 2025/0005443 | A1 * | 1/2025 | Mezghani | G06N 20/00 |
| 2025/0090905 | A1 * | 3/2025 | Jacobs, II | A63B 24/0006 |

* cited by examiner

*Primary Examiner* — Pritham D Prabhakher

(74) *Attorney, Agent, or Firm* — Schwegman Lundberg & Woessner, P.A.

(57) ABSTRACT

A method includes receiving a digital representation of an image of a subject, applying an image artifact machine learning model to generate a classification of the image as containing an image artifact including an identification of a type of the image artifact, identifying an image remediation process based on the classification, and applying the identified image remediation process to remediate the image artifact.

18 Claims, 6 Drawing Sheets

600

700

800

IMAGE CAPTURE WITH ARTIFACT REMEDIATION

BACKGROUND

With modern digital photography, there are many forms of artifacts. These are typically visible and result in an overall lower capture quality. Some of these are due to light physics and some are due to calibration, and capture settings. Artifacts can happen during a screen capture because of the inherent working principle of a digital camera system. Various such artifacts include Moiré patterns consisting of slanted lines and stripes, rainbow effects, and vertical and horizontal black lines. Photographers are usually required to avoid certain objects or angles to mitigate artifacts which can adversely affect the ability to capture a photograph containing desired content.

There are certain post processing capabilities that can be applied to the video or images of the captures with artifacts to limit the visibility of such artifacts. Such post processing capabilities are very limited and may not totally ameliorate the undesirable visible effects. One example of post processing involves inpainting to estimate pixel values based on surrounding information. MATLAB's inpaintexemplar is one program capable of such inpainting. Other examples would be Adobe® Photoshop, or Google®.

Some advanced semiconductor circuitry can detect artifacts and adjust the capture settings to avoid certain artifacts, but these typically circuitry exists only on superior digital single lens reflex (DSLR) cameras which are very expensive.

SUMMARY

A method includes receiving a digital representation of an image of a subject, applying an image artifact machine learning model to generate a classification of the image as containing an image artifact including an identification of a type of the image artifact, identifying an image remediation process based on the classification, and applying the identified image remediation process to remediate the image artifact.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
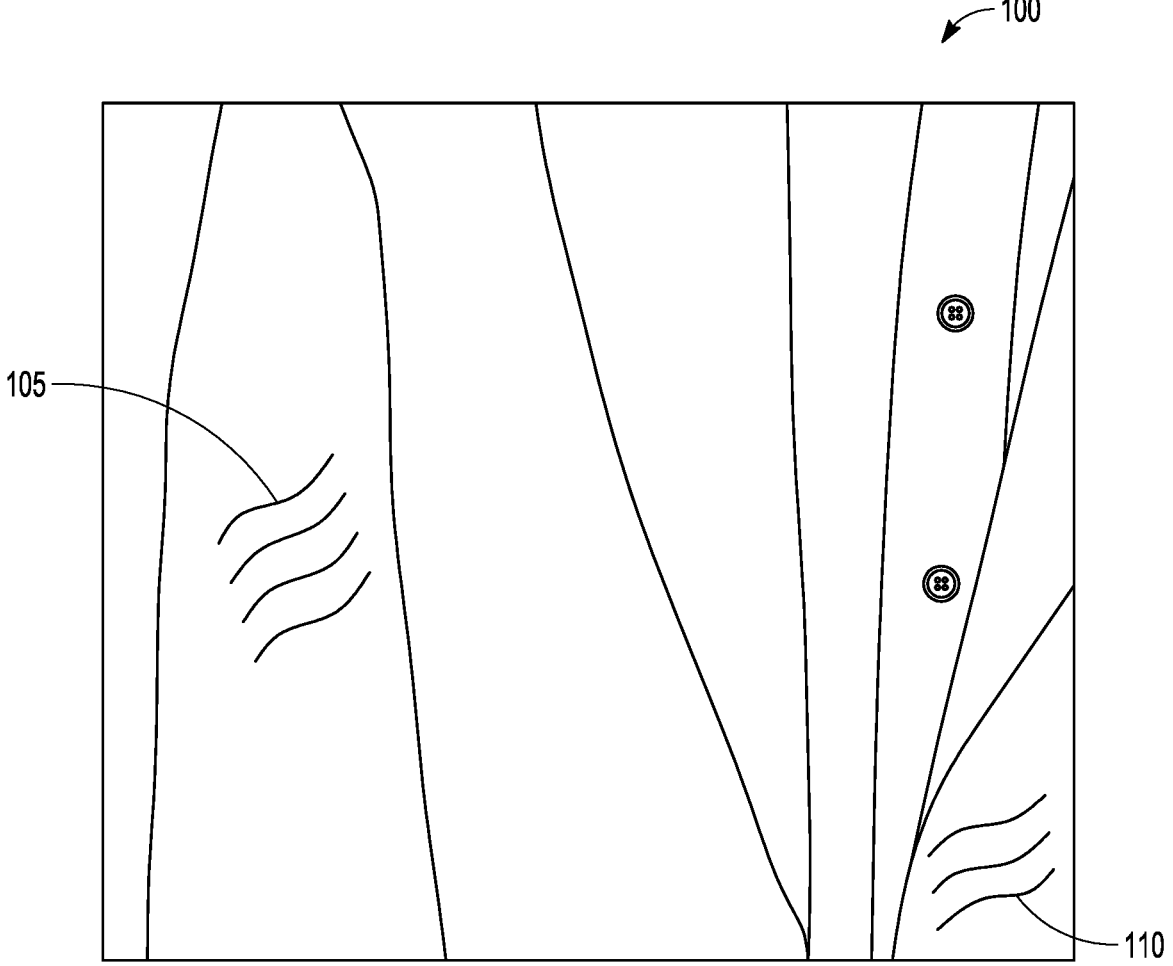
FIG. 1 is an image that includes at least one Moiré pattern image artifact according to an example embodiment.

There are various artifacts that can happen during a screen capture because of the inherent working principle of a camera system. Image artifacts are defined using the following examples. FIG. 1 is an image 100 that includes at least one Moiré pattern, an image artifact that includes areas, represented generally at 105 and 110, having sets of slanted lines and stripes of various colors.

Figure 2:
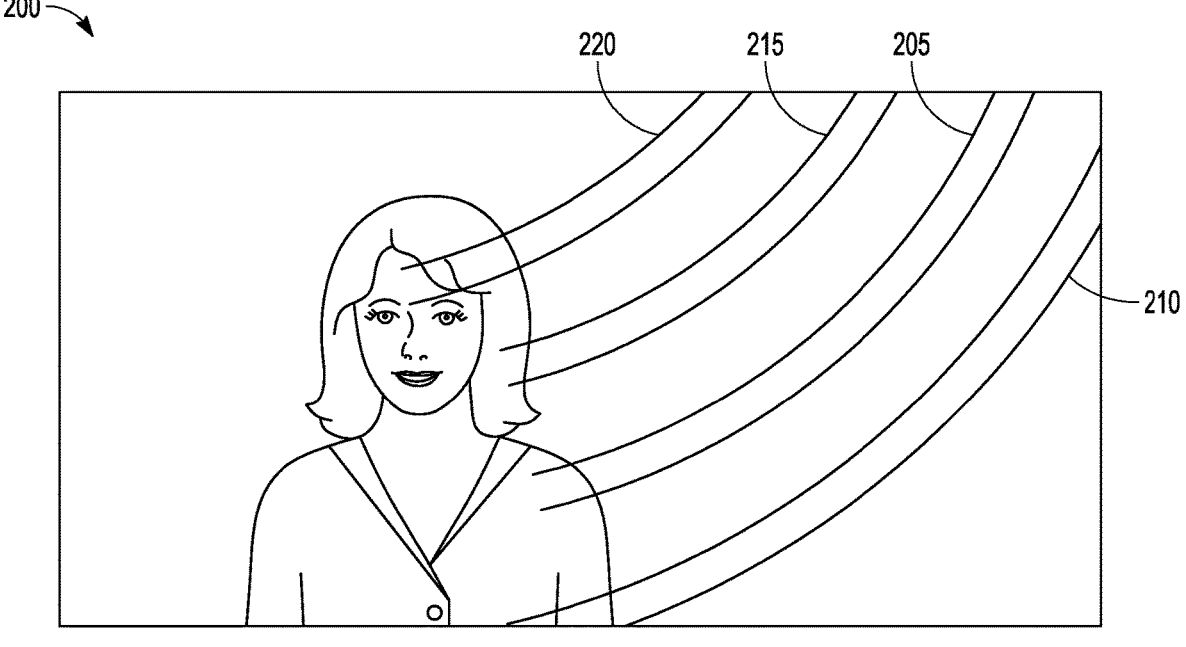
FIG. 2 is an image illustrating rainbow effect image artifact according to an example embodiment.

FIG. 2 is an image 200 illustrating rainbow effects at least at rainbow artifacts 205, 210, 215, and 220. While represented generally as arcing areas, each area may appear like a rainbow in color photographs, with varying color through each area.

Figure 3:
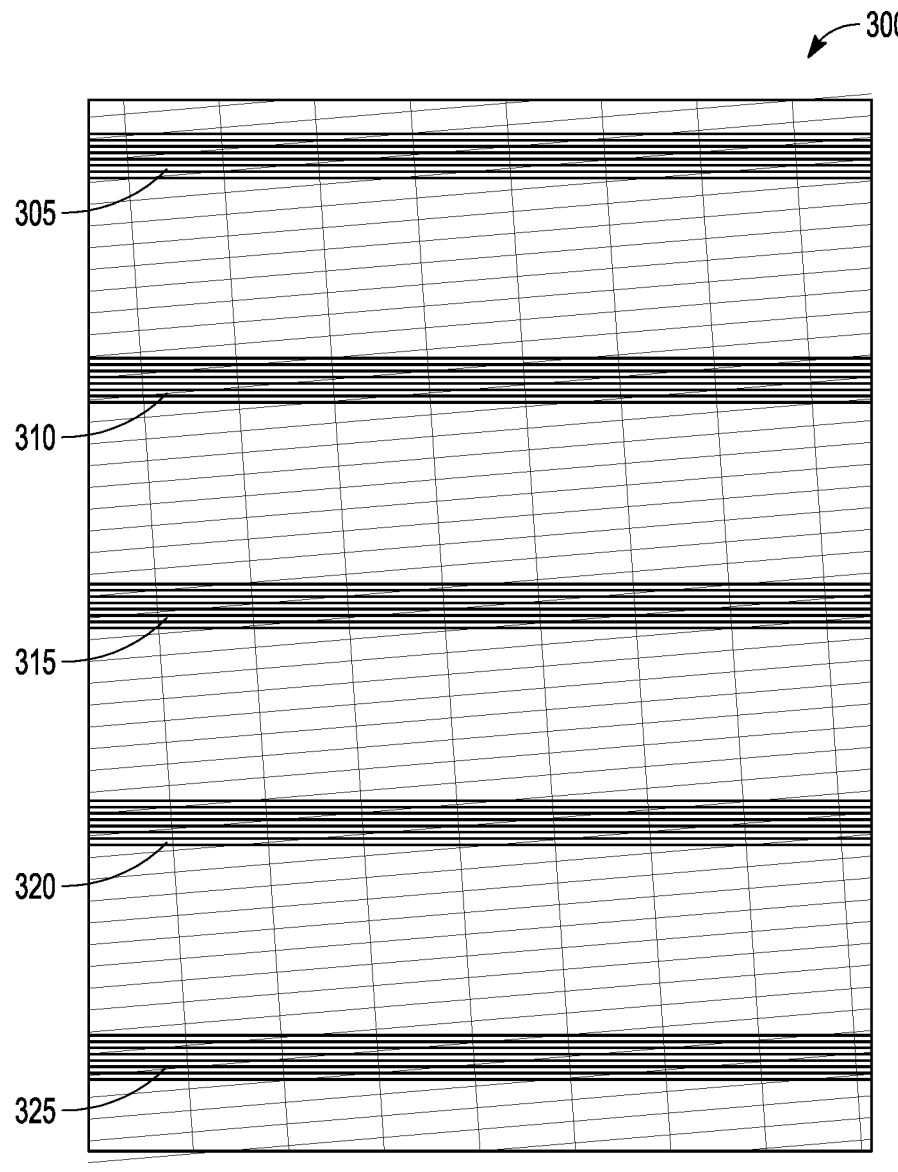
FIG. 3 is an image that illustrates horizontal black lines image artifact according to an example embodiment.

FIG. 3 is an image 300 that illustrates horizontal black lines at least at 305, 310, 315, 320, and 325. Black lines are a common image artifact that can be a side effect of a horizontal refresh rate of a display being photographed or a camera rolling shutter or both. The lines may be vertical or horizontal depending on portrait or landscape orientations of the display and/or camera. Each of the lines may vary in shade transversely, from light to dark to light.

Image artifacts, as that term is used herein, do not include out of focus areas of an image. In some examples, image artifacts may occur in only portions of an entire image, such as an area of the image smaller than the entire image.

An improved image artifact remediation system utilizes a driver-level or application-level recognition algorithm to detect what type of image artifacts listed above exist in which area or areas of the screen in real time. The system applies selected remediations such as changes to camera capture settings to provide a better capture result. Remediation may also or alternatively involve applying certain post-processing with the capture results to reduce or eliminate human perceivable artifacts in the resulting captured image.

Figure 4:
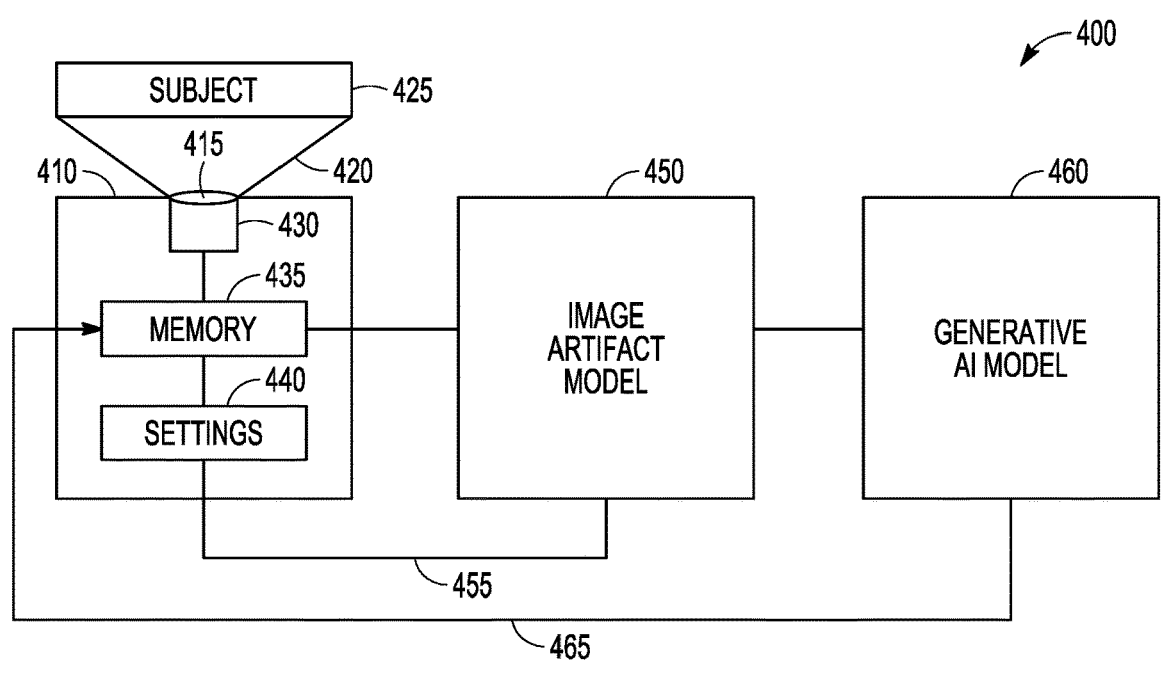
FIG. 4 is a block diagram an image artifact remediation system for mediating image artifacts in digital representations of images according to an example embodiment.

FIG. 4 is a block diagram an image artifact remediation system 400 for mediating image artifacts in digital representations of images. System 400 in one example includes a digital camera 410 having a lens 415 for capturing light 420 reflected from a subject 425. The captured light is focused on an image sensor 430. Typical image sensors include a charge-coupled device (CCD) or active-pixel sensors such as complementary metal-oxide semiconductor (CMOS) sensors.

The image sensor 430 generates pixel information which is stored in memory 435. Camera 410 may also have various settings 440 for adjusting parameters used for image capture such as shutter speed, aperture, focus, and other settings that can be set via a user interface or an application programming interface (API).

Camera 410 is coupled via a connector 445 to an image artifact model 450 that has been trained to recognize image artifacts in images stored in memory 435. Model 450 may operate in a server or cloud environment in one example. The connector 445 may be a wired connection or a wireless connection in various examples. In one example, the image artifact model 450 may be part of camera 410 as opposed to executing on a separate server or cloud computing resources.

In one example, as the camera 410 is capturing light from subject 425, image data captured by the image sensor 430 is stored in memory 435 and sent to image artifact model 450 for classification. The classification in one embodiment identifies a type or types of artifacts in the image data. In one example, the type of artifact is used to generate changes to one or more settings 440. The changes may be generated by the model 450 in one example or post classification logic may generate setting changes based on the type of image artifact. Such post processing may be performed by the camera 410 or other processing resources in varying examples. The changes to the settings may be provided by connection 455 and work to remediate or at least partially reduce the visual appearance of the identified image artifact.

In one example, image data captured after the setting changes is again provided to the image artifact model 450 to determine whether or not changes in the artifact or removal was accomplished. A limited number of iterations may be performed to obtain best settings to remediate the image artifacts in one example. The number of settings changes may be just one, or more depending on desired overall capture speed and whether or not the image artifact remains visible or is acceptably diminished. A limit of 3 may be used in one example but the limit may be higher if higher processing speeds are available. In one example, each image prior to and following the one or more iterations may be saved to memory 435 or even server or cloud-based storage to allow a user of the camera to view on a display of the camera or other display and select a desired image to store to a camera roll on memory 435, or may be used to continuously improve the image artifact model 450.

Image artifact model 450 in one example may be a segmentation-based model that identifies one or more specific areas of the image data which contain image artifacts along with an identification of the image artifact. For some image artifact types, adjustment of camera settings is not effective in remediation of the artifact, or some undesired visibility of an artifact may remain following adjustment of settings. After the camera setting adjustments, new image capture data is checked, and if they still exist in certain captures, such as still images or video frames, a generative AI correction may be performed by a pre-trained generative AI model 460 to remedy these artifacts.

Generative AI model 460 may include one or more models, each trained to remove a specific type of artifact, or a model such as commonly used to remove elements from images and extrapolate from remaining image data to create likely in-fill pixels to replace the element that was removed.

In one example, generative AI model 460 may simply take the classification of the image as containing an artifact and operate as a generative AI model, such as StyleGAN, capable of translating the image into higher dimensional representations and adjust dimensions to generate a remediated image after perturbation performed in the higher dimensional representations.

In one example, system 400 operates like a pipeline. Image data, along with the identification of the artifact and area containing the artifact classified by image artifact model 450 is provided to the generative AI model 460.

Generative AI model 460 may be applied to the identified areas to remove the artifacts present and fill in with likely pixels. In various examples, the areas may be identified by triangle lists, or even rectangular lists of coordinates in the image containing the artifacts.

Figure 5:
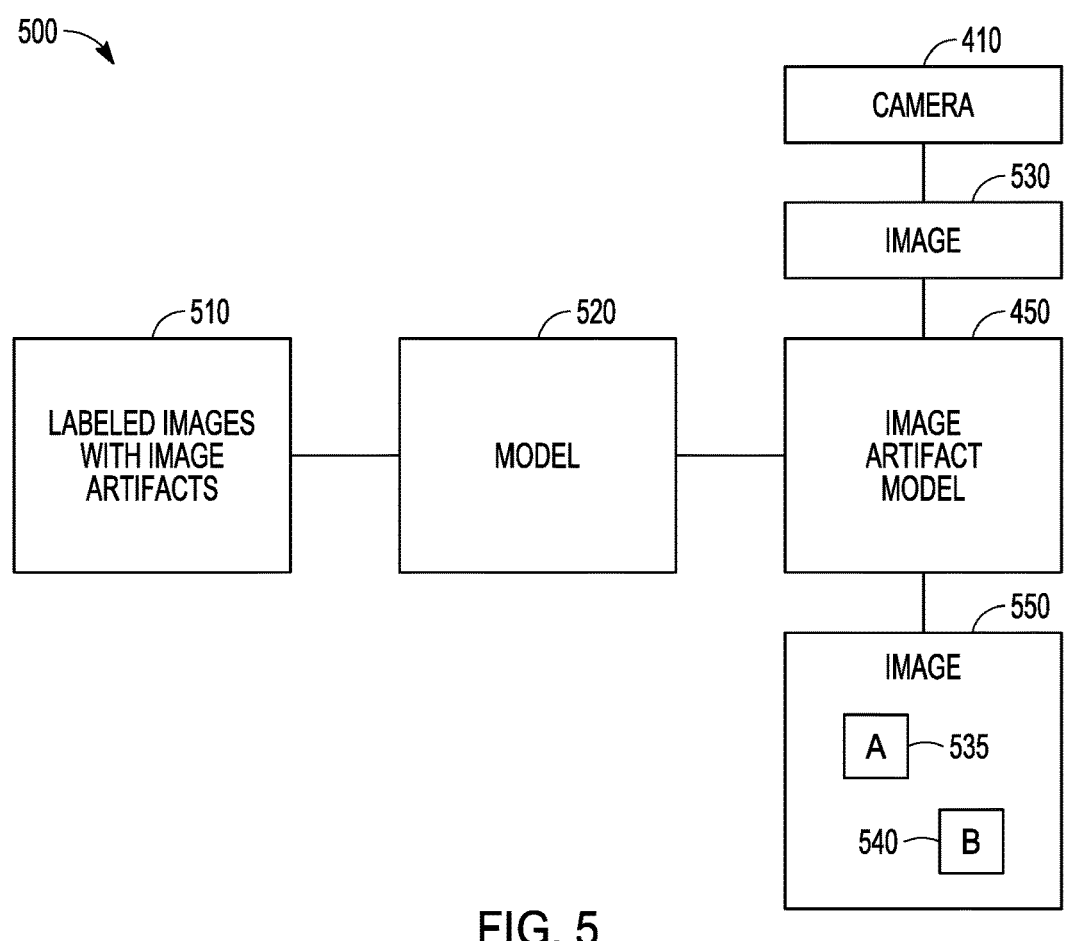
FIG. 5 is a block flow diagram illustrating training and operation of image artifact model according to an example embodiment.

FIG. 5 is a block flow diagram illustrating training and operation of image artifact model 450 generally at 500. A model 520, such as a Meta® Segment Anything Model (SAM) with object recognition, is trained with training images 510 containing artifacts and annotation labeling. Model 520 may be optimized to generate the image artifact model 450. In further examples, model 520 need not include segmentation capabilities and may be trained to determine that the image contains an image artifact, regardless of location of the image artifact in the image. In operation, model 450 receives an image 530 from camera 410 which may or may not contain image artifacts. If the image 530 does contain at least one image artifact as indicated at image artifact 535 and image artifact 540 represented in a labeled image 550 model 450 may output a mask with artifact area also represented at 535 and 540 and labeling identifying the artifact type or types.

Figure 6:
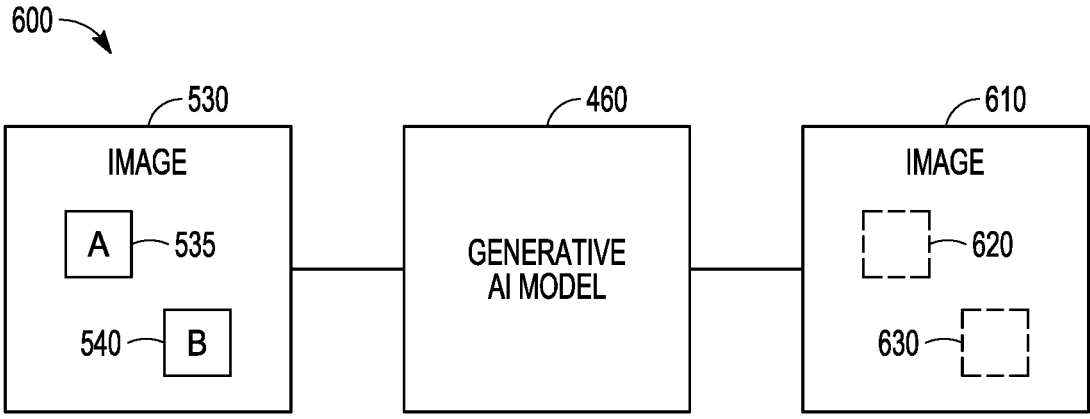
FIG. 6 is a block flow diagram illustrating operation of generative AI model according to an example embodiment.

FIG. 6 is a block flow diagram illustrating operation of generative AI model 460. Generative AI model 460 may use information from model 450 and surrounding image area, and in the case of video, a previous frame, to create generative content 620 and 630 to fill up the masked area corresponding to one or more artifacts. Generative AI model 460 may utilize services from Google® referred to as "Magic Eraser tool" to fill up the masked area or areas in one example. In further examples, specially trained generative AI models, such as a model for each type of artifact may be used to ensure text and other information in masked areas is maintained, such as for removal of rainbow image artifacts and Moire pattern artifacts. For rainbow image artifacts, the generative AI model 460 may operate to maintain image detail while modifying color to remove rainbows.

The following examples include description of the operation of system 400 in applying one or both of the image artifact model 450 and generative AI model 460.

Moiré patterns 105 may result from a subject being photographed having high frequency detail that is aliased. The camera 410 may be able to pick up some of the detail but is unable to completely render the detail. In a screen capture case such as image 300, there may be more screen pixels than can be picked up by even a high-resolution camera. Fine patterns will result in aliasing when picked up by the high-resolution camera such as camera 410. The Moiré pattern image artifact is unable to be resolved in normal post processing but can be reduced or eliminated utilizing generative AI image generation systems, which may be further trained to retain background details while removing Moiré patterns.

Typically, the photography industry will avoid these types of subjects in photo shoots since this is really a hardware level limitation and can't be solved by adjusting camera settings.

In one example, image artifact model 450 detects the type of artifact and area of the Moiré pattern. The system 400 will adjust a focus setting of the camera by changing settings 440 slightly to result in a capture that is just slightly out of focus and in most cases, the Moiré effect will disappear because the out-of-focus camera is not capturing all the pixel or pattern details on the subject that's causing the issue. The amount of slightly out of focus may be adjusted based on user preferences and a balance between removing an image artifact and the resulting overall quality of the image. If the remediated image is too out of focus for a user, a next iteration may use a less out of focus setting. In one example, the amount of out of focus may be selected to be the smallest value that still reduces the Moiré artifact to a level that does not adversely affect the overall quality of the image.

The system 400 may continue to search for the Moiré pattern following such focus adjustment in the view finder in a second iteration, and if the Moiré pattern still exists, the system 400 may apply generative AI model 460 to correct the artifacts in the area identified by image artifact model 450. This will be done before the image or video is saved to the camera memory 435 as a final version of the capture result, referred to as the camera roll.

Rainbow effects 205, 210, 215, and 220 may also be corrected. Depending on the camera sensor, sometimes due to lens size and lighting conditions, there might be a rainbow effect present in the capture. This is sometimes called a light leak. Sometimes these can negatively affect the shot, but that's not always the case. Rainbows and rainbow lights can also add delight and beauty to the capture. The user is able to select if they want to remove this or not. The user of the camera 410 may be provided an option via a user interface displayed with the image on whether or not to perform image artifact remediation.

If remediation is selected, it's typical to use an additional lens attachment filter for filtering out the excess light coming into the lens for photography. The system 400 may apply the generative AI model 460 when it is determined to remove these artifacts. The areas containing the artifact are first identified by image artifact model 450 and provided as input to the generative AI model 460 to generate an image without such artifacts.

Black line artifacts 305, 310, 315, 320, and 325 may also occur when capturing a screen. And it's most obvious when the content of the screen is mostly bright. When the proposed solution detects this type of flicker artifact, there are several ways to remediate the issue. Not limited to screens, lighting/electricity frequency in different regions could also differ.

When black line artifacts are detected and areas identified by image artifact model 450, settings, such as the frame rate setting (for video capture) and shutter speed setting (for video and still shots) may be adjusted based on data gathered from the camera 410. In various examples, geolocation data may be gathered to look up and obtain a typical frequency of electricity in the region. Further data that may be gathered includes data to determine the screen/light refresh rate, brightness level, on-time, or duty cycle. Such gathered data may be used to calculate a correct shutter speed to avoid capturing these patterns. ISO and other related camera settings may be adjusted to keep the image quality ideal. Lookup tables may be used in one example to determine such adjustments.

After making the camera setting adjustments, the system 400 may perform another iteration of processing capture results for image artifacts and if they still exist in certain frames or captures, apply generative AI correction using generative AI model 460, which again may comprise different models trained on different types of image artifacts.

Figure 7:
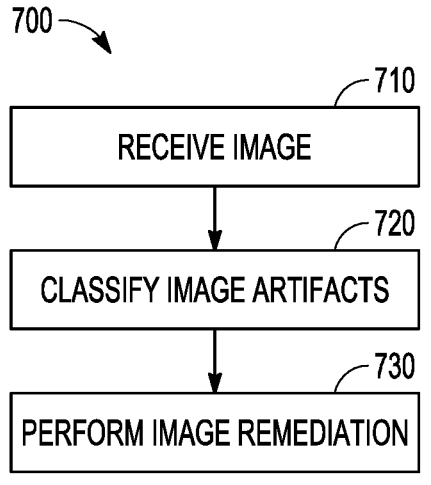
FIG. 7 is a flowchart illustrating a computer implemented method of remediating image artifacts according to an example embodiment.

FIG. 7 is a flowchart illustrating a computer implemented method 700 of remediating image artifacts. Method 700 begins at operation 710 by receiving a camera sensed digital representation of an image of a subject. An image artifact machine learning model is applied to the representation of the image at operation 720 to generate a classification of an area of the image containing an image artifact including an identification of a type of the image artifact. At operation

730, an image remediation process is identified based on the classification. The identified image remediation process is applied to the representation of the image at operation 740 to remediate the image artifact.

In one example, the image artifact machine learning model comprises a model trained on training images having image artifacts, each training image including a label identifying the type of image artifact.

There are several different types of image remediation processes. In one example, the image remediation processes comprises adjusting camera settings based on the identification of the type of the image artifact. One such setting includes adjusting a focus setting to an out of focus setting to remediate a Moiré image artifact. Another setting includes adjusting at least one of a frame rate or shutter speed to remediate a black lines image artifact.

In one example, applying the identified image remediation process comprises iteratively adjusting camera settings by successively repeating adjusting the camera settings and classifying resulting images following such adjusting of the camera settings.

The image classification model may be based on a segmentation model that identifies an area of the image containing an image artifact. Applying the identified image remediation process may alternatively include providing the classification and the image to a generative AI model trained to generate image content for the area to remediate the artifact and generate a final image including the generated image content.

Identifying the image remediation process may include identifying, based on the identified type of image artifact, one of multiple generative AI models, each model trained on remediating a different type of image artifact and using the one of the multiple generative AI models to generate a final image.

Figure 8:
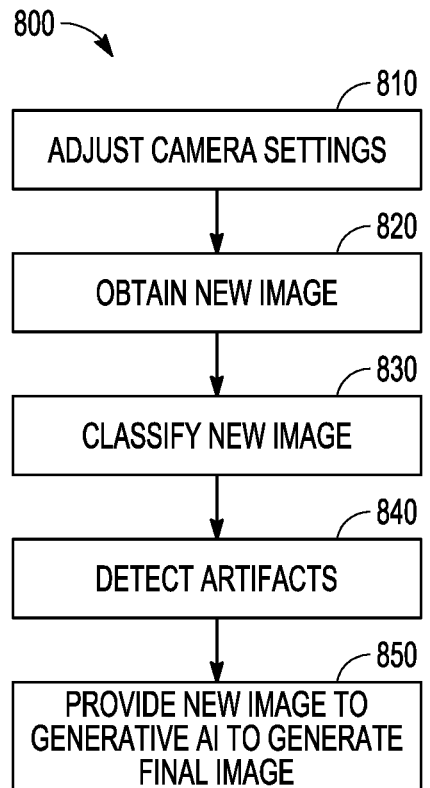
FIG. 8 is a flowchart illustrating a computer implemented method of applying the identified image remediation process according to an example embodiment.

FIG. 8 is a flowchart illustrating a computer implemented method 800 of applying the identified image remediation process. Method 800 begins at operation 810 by adjusting camera settings based on the identification of the type of the image artifact. At operation 820, a new image is obtained based on adjusted camera settings. The image artifact machine learning model is applied at operation 830 to generate a classification of the new image. Operation 840 detects if artifacts remain in the new image. If so, the new image and classification is provided at operation 850 to a generative AI model trained to generate image content for the area to remediate the artifact and generate a final image including the generated image content.

Figure 9:
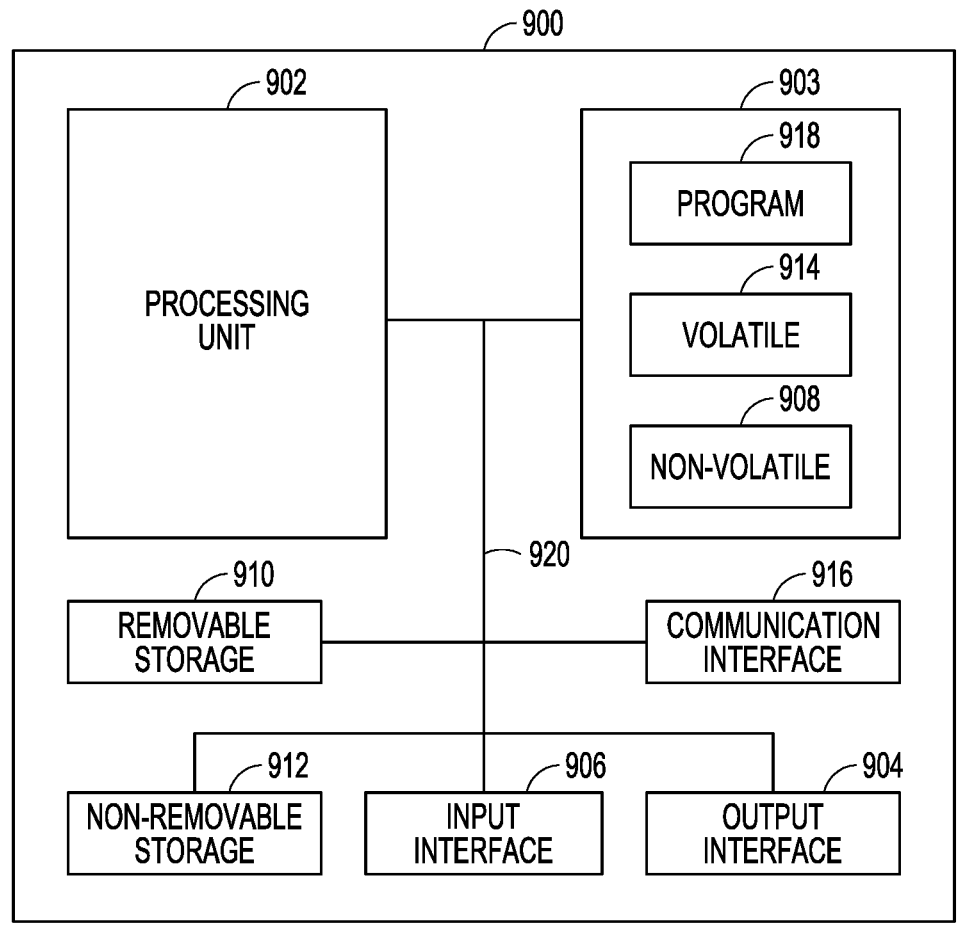
FIG. 9 is a block schematic diagram of a computer system to implement one or more example embodiments.

FIG. 9 is a block schematic diagram of a computer system 900 to remediate image artifacts and for performing methods and algorithms according to example embodiments. All components need not be used in various embodiments. Camera 400 may also include many of the components of system 900 in various examples.

One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, smart storage device (SSD), or other computing device including the same or similar elements as illustrated and described with regard to FIG. 9. Devices, such as smartphones, tablets, and smartwatches, are generally collectively referred to as mobile devices or user equipment.

Although the various data storage elements are illustrated as part of the computer 900, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input interface 906, output interface 904, and a communication interface 916. Output interface 904 may include a display device, such as a touchscreen, that also may serve as an input device. The input interface 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 900 are connected with a system bus 920.

Computer-readable instructions stored on a computer-readable medium are executable by the processing unit 902 of the computer 900, such as a program 918. The program 918 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 918 along with the workspace manager 922 may be used to cause processing unit 902 to perform one or more methods or algorithms described herein.

EXAMPLES

1. A method includes receiving a digital representation of an image of a subject, applying an image artifact machine learning model to generate a classification of the image as containing an image artifact including an identification of a type of the image artifact, identifying an image remediation process based on the classification, and applying the identified image remediation process to remediate the image artifact.

2. The method of example 1 wherein the image artifact machine learning model includes a model trained on training images having image artifacts, each training image including a label identifying the type of image artifact.

3. The method of any of examples 1-2 wherein the image is received from a camera and wherein the remediation process includes adjusting camera settings based on the identification of the type of the image artifact.

4. The method of example 3 wherein adjusting the camera settings comp includes rises adjusting a focus setting to an out of focus setting to remediate a Moiré image artifact.

5. The method of any of examples 3-4 wherein applying the identified image remediation process includes iteratively adjusting camera settings by successively repeating adjusting the camera settings and classifying resulting images following such adjusting of the camera settings.

6. The method of any of examples 3-5 herein adjusting the camera settings includes at least one of adjusting a shutter speed to remediate a black lines image artifact, adjusting a shutter speed and ISO to maintain average brightness and remediate a black lines image artifact.

7. The method of any of examples 1-6 wherein applying the identified image remediation process includes applying a generative AI model to remediate the artifact and generate a final image including the generated image content.

8. The method of example 7 wherein the image artifact machine learning model includes segmentation to identify a segment containing the image artifact and wherein the generative AI model is applied to the segment.

9. The method of any of examples 1-8 wherein identifying the image remediation process includes identifying, based on the identified type of image artifact, one of multiple generative AI models, each model trained on remediating a different type of image artifact and using at least one of the multiple generative AI models to generate a final image.

10. The method of any of examples 1-9 wherein the classification the image containing an image artifact identifies an area of the image containing the image artifact, and wherein applying the identified image remediation process includes adjusting camera settings based on the identification of the type of the image artifact, obtaining a new image based on adjusted camera settings, applying the image artifact machine learning model to generate a classification of the new image, detecting that artifacts remain in the new image, and providing the new image and classification to a generative AI model trained to generate image content for the area to remediate the artifact and generate a final image including the generated image content.

11. A machine-readable storage device having instructions for execution by a processor of a machine to cause the processor to perform operations to perform any of the methods of examples 1-10.

12. A device includes a processor and a memory device coupled to the processor and having a program stored thereon for execution by the processor to perform operations to perform any of the methods of examples 1-10.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
   receiving a digital representation of an image of a subject;
   applying an image artifact machine learning model to generate a classification of the image as containing an image artifact including an identification of a type of the image artifact;
   identifying an image remediation process based on the classification by iteratively adjusting camera settings and classifying resulting images following such adjusting of the camera settings; and
   applying the identified image remediation process to remediate the image artifact.

2. The method of claim 1 wherein the image artifact machine learning model comprises a model trained on training images having image artifacts, each training image including a label identifying the type of image artifact.

3. The method of claim 1 wherein the image is received from a camera and wherein the remediation process comprises adjusting camera settings based on the identification of the type of the image artifact.

4. The method of claim 3 wherein adjusting the camera settings comprises adjusting a focus setting to an out of focus setting to remediate a Moiré image artifact.

5. The method of claim 3 herein adjusting the camera settings comprises at least one of adjusting a shutter speed to remediate a black lines image artifact, adjusting a shutter speed and ISO to maintain average brightness and remediate a black lines image artifact.

6. The method of claim 1 wherein applying the identified image remediation process comprises applying a generative AI model to remediate the artifact and generate a final image.

7. The method of claim 6 wherein the image artifact machine learning model includes segmentation to identify a segment containing the image artifact and wherein the generative AI model is applied to the segment.

8. The method of claim 1 wherein identifying the image remediation process comprises:
   identifying, based on the identified type of image artifact, one of multiple generative AI models, each model trained on remediating a different type of image artifact; and
   using at least one of the multiple generative AI models to generate a final image.

9. The method of claim 1 wherein the classification the image containing an image artifact identifies an area of the image containing the image artifact, and wherein applying the identified image remediation process comprises:
   adjusting camera settings based on the identification of the type of the image artifact;
   obtaining a new image based on adjusted camera settings;
   applying the image artifact machine learning model to generate a classification of the new image;
   detecting that artifacts remain in the new image; and
   providing the new image and classification to a generative AI model trained to generate image content for the area to remediate the artifact and generate a final image including the generated image content.

10. A non-transitory machine-readable storage device having instructions for execution by a processor of a machine to cause the processor to perform operations to perform a method, the operations comprising:
   receiving a digital representation of an image of a subject;
   applying an image artifact machine learning model to generate a classification of the image as containing an image artifact including an identification of a type of the image artifact;
   identifying an image remediation process based on the classification by iteratively adjusting camera settings and classifying resulting images following such adjusting of the camera settings; and
   applying the identified image remediation process to remediate the image artifact.

11. The device of claim 10 wherein the image artifact machine learning model comprises a model trained on training images having image artifacts, each training image including a label identifying the type of image artifact.

12. The device of claim 10 wherein the image is received from a camera and wherein the remediation process comprises adjusting camera settings based on the identification of the type of the image artifact.

13. The device of claim 12 wherein adjusting the camera settings comprises adjusting a focus setting to an out of focus setting to remediate a Moiré image artifact.

14. The device of claim 12 herein adjusting the camera settings comprises at least one of adjusting a shutter speed to remediate a black lines image artifact, adjusting a shutter speed and ISO to maintain average brightness and remediate a black lines image artifact.

15. The device of claim 10 wherein applying the identified image remediation process comprises applying a generative AI model to remediate the artifact and generate a final image.

16. The device of claim 10 wherein identifying the image remediation process comprises operations including:

identifying, based on the identified type of image artifact, one of multiple generative AI models, each model trained on remediating a different type of image artifact; and using at least one of the multiple generative AI models to generate a final image.

17. A device comprising:

a processor; and a memory device coupled to the processor and having a program stored thereon for execution by the processor to perform operations comprising:

receiving a digital representation of an image of a subject;

applying an image artifact machine learning model to generate a classification of the image as containing an image artifact including an identification of a type of the image artifact;

identifying an image remediation process based on the classification by iteratively adjusting camera settings and classifying resulting images following such adjusting of the camera settings; and applying the identified image remediation process to remediate the image artifact.

18. The device of claim 17 wherein identifying the image remediation process comprises operations including:

identifying, based on the identified type of image artifact, one of multiple generative AI models, each model trained on remediating a different type of image artifact; and using at least one of the multiple generative AI models to generate a final image.

\* \* \* \* \*